(12) United States Patent
Lea et al.

(10) Patent No.: US 7,737,861 B2
(45) Date of Patent: Jun. 15, 2010

(54) LOCATION, COMMUNICATION AND TRACKING SYSTEMS

(75) Inventors: Kelvin Edward Lea, Auckland (NZ); Jonathan Rae Lowther, Auckland (NZ)

(73) Assignee: Paxflow Holdings Pte Ltd., Singapore (SG)

( * ) Notice: Subject to any disclaimer, the term of this patent is extended or adjusted under 35 U.S.C. 154(b) by 0 days.

(21) Appl. No.: 10/481,376

(22) PCT Filed: Jun. 19, 2002

(86) PCT No.: PCT/NZ02/00113

§ 371 (c)(1), (2), (4) Date: Dec. 18, 2003

(87) PCT Pub. No.: WO02/103384

PCT Pub. Date: Dec. 27, 2002

(65) Prior Publication Data

US 2004/0169589 A1 Sep. 2, 2004

(30) Foreign Application Priority Data

Jun. 19, 2001 (NZ) .................... 512454
May 7, 2002 (NZ) .................... 518776

(51) Int. Cl.
*G01S 5/14* (2006.01)
(52) U.S. Cl. ............. 340/825.49; 340/10.1; 340/539.13
(58) Field of Classification Search ............ 340/825.49, 340/539.13, 10.1; 455/456.1
See application file for complete search history.

(56) References Cited

U.S. PATENT DOCUMENTS

| | | | | |
|---|---|---|---|---|
| 4,495,496 A | * | 1/1985 | Miller, III | 340/10.2 |
| 5,218,343 A | * | 6/1993 | Stobbe et al. | 340/573.4 |
| 5,311,185 A | | 5/1994 | Hochstein et al. | |
| 5,317,309 A | * | 5/1994 | Vercellotti et al. | 340/10.5 |
| 5,485,163 A | | 1/1996 | Singer et al. | |
| 5,493,692 A | * | 2/1996 | Theimer et al. | 455/26.1 |
| 5,543,797 A | | 8/1996 | Hochstein et al. | |
| 5,568,512 A | * | 10/1996 | Rotzoll | 375/221 |
| 5,583,850 A | | 12/1996 | Snodgrass et al. | |
| 5,682,142 A | * | 10/1997 | Loosmore et al. | 340/572.1 |
| 5,790,974 A | * | 8/1998 | Tognazzini | 455/456.5 |
| 5,841,770 A | | 11/1998 | Snodgrass et al. | |
| 5,914,671 A | * | 6/1999 | Tuttle | 340/10.42 |
| 5,974,078 A | | 10/1999 | Tuttle et al. | |
| 5,988,510 A | | 11/1999 | Tuttle et al. | |
| 5,995,898 A | | 11/1999 | Tuttle | |

(Continued)

FOREIGN PATENT DOCUMENTS

EP 0 586 230 3/1994

(Continued)

*Primary Examiner*—Edwin C Holloway, III
(74) *Attorney, Agent, or Firm*—Young & Thompson (57) ABSTRACT

A passenger location system comprises a plurality of radio transceivers at predetermined locations in a passenger terminal facility. At least one transponder is associated in use with a passenger. The transponder is adapted to transmit a radio signal in response to receiving a signal from one or more of the transceivers. The transponder signal is capable of being received by more that one transceiver. The passenger location means is adapted to determine the position of the transponder by determining the location of the one or more transceiver that have received the transponder signal.

15 Claims, 9 Drawing Sheets

U.S. PATENT DOCUMENTS

| | | | |
|---|---|---|---|
| 6,009,333 A * | 12/1999 | Chaco | 455/456.5 |
| 6,040,774 A * | 3/2000 | Schepps | 340/572.1 |
| 6,078,791 A | 6/2000 | Tuttle et al. | |
| 6,127,917 A | 10/2000 | Tuttle | |
| 6,130,602 A | 10/2000 | O'Toole et al. | |
| 6,144,916 A | 11/2000 | Wood, Jr. et al. | |
| 6,177,859 B1 | 1/2001 | Tuttle et al. | |
| 6,335,688 B1 * | 1/2002 | Sweatte | 340/573.1 |
| 6,339,709 B1 | 1/2002 | Gladwin et al. | |
| 6,462,656 B2 * | 10/2002 | Ulrich et al. | 340/539.1 |
| 6,484,033 B2 * | 11/2002 | Murray | 455/456.3 |
| 6,509,829 B1 | 1/2003 | Tuttle | |
| 6,631,271 B1 * | 10/2003 | Logan | 455/456.1 |
| 6,657,549 B1 | 12/2003 | Avery | |
| 6,963,270 B1 * | 11/2005 | Gallagher et al. | 340/10.2 |

FOREIGN PATENT DOCUMENTS

| | | |
|---|---|---|
| EP | 0 851 239 | 7/1998 |
| EP | 0 924 681 | 6/1999 |
| FR | 2 038 185 | 1/1971 |
| WO | WO 98/45728 | 10/1998 |
| WO | WO 99/36798 | 7/1999 |
| WO | WO 01/11386 | 2/2001 |
| WO | WO 01/11386 A1 | 2/2001 |
| WO | WO 01/37004 | 5/2001 |

* cited by examiner

FIG. 1. Passenger arrival.

FIG. 2. Passenger makes their way to ticket issuing desk.

FIG. 3. Passenger EBC (electronic boarding clip) is activated on boarding pass.

FIG. 4. Passenger receives boarding pass with ETC. Network tracking is activated.

FIG. 5. Passenger proceeds to immigration.

FIG. 6. Passenger proceeds to bar/cafe/retail area. First boarding call is made.

FIG. 7. Another passenger is "blipped" via ETC and responds, proceeds to departure gate.

FIG. 8. Second call, boarding alert. Passenger is tracked via Paxflow.

FIG. 9. Passenger location is identified. A designated staff member proceeds to passenger area.

FIG. 10. Passenger is escorted out of bar area. Proceeds to boarding gate.

FIG. 11. Passenger hands in pass with EBC. Boards plane.

LOCATION, COMMUNICATION AND TRACKING SYSTEMS

TECHNICAL FIELD OF THE INVENTION

This invention has relevance to communication systems and to location, tracking and identification systems. The invention is directed particularly, but not solely, toward location and tracking of, and communication with, individuals. The invention may also be used to track or locate inanimate objects.

BACKGROUND OF THE INVENTION

There are many industries in which it is desirable to track people or objects, for example, vehicles, baggage or documents, in real time. One particular industry is the air travel industry, where it is very desirable for economic and security reasons to be able to track passengers within airports. However, the travel industry generally also has a need for passenger location and tracking systems. Other environments where tracking and location is desirable include casinos, cruise ships, amusement facilities and hospitals. Location, tracking and communication in relation to medical alert systems and security systems is also desirable.

In the case of air travel, it has long been recognised that air travel congestion results in massive revenue loss in airline ground costs through airport terminal delays. One particular area of revenue loss that has not been targeted to date is excessive time spent by passengers in transport terminals.

In particular, recent evidence suggests that airline passengers are becoming increasingly complacent about boarding their aircraft. This is because they know their bags are on board the aircraft and the aircraft cannot depart without them, or without unloading their bags. Unloading bags on a Boeing 747 aircraft, for example, can take up to 60-90 minutes by the time the relevant baggage containers are found and removed. To the airline, this delay results in costing tens of thousands of dollars. There are also flow-on effects of these delays. These effects are significant, involving loss of flight slots, missing connections for passengers, general network disruption, and aircraft crews having to work (and be paid for) overtime.

This problem has not been addressed, and effective methods of reducing the resultant delays have not been identified. Tracking using a transponder which responds to radio frequency signals has been attempted in the past, but has not been suitable for practical implementation and use in large scale environments where there are a large number of individuals or objects that need to be tracked.

OBJECT OF THE INVENTION

It is an object of the present invention to provide an improved location, communication, tracking or identification system. An alternative object of the invention is to provide a useful alternative to or choice over, existing systems,

SUMMARY OF THE INVENTION

In one aspect the invention consists in a passenger location system having
- a plurality of radio signal transceiver devices provided at predetermined physical locations in a passenger terminal facility,
- at least one passenger transponder device associated in use with the passenger, the transponder being adapted to transmit a radio signal in response to receiving a signal from one or more of the transceiver devices,
- the transponder signal being capable of being received by more than one transceiver, and
- passenger location means adapted to determine the position of the transponder by determining the location of the one or more transceiver devices that have received the transponder signal.

In another aspect the invention consists in a method of locating a passenger in a passenger terminal facility, the method including the steps of
- providing a plurality of radio signal transceiver devices at predetermined physical locations in the facility,
- providing the passenger with a transponder device which transmits a radio signal in response to receiving signal from one or more of the transceiver devices,
- activating one or more of the transceiver devices so that the one or more transceiver devices transmit a radio signal,
- receiving a signal from the transponder on one or more transceiver devices, and
- identifying the location of the transponder based upon the physical location of the one or more transceiver devices that received the transponder signal.

Preferably, the method further includes the step of evaluating the strength of the transponder signal received by the more or more transceiver devices in order to determine location of the transponder.

In a further aspect the invention consists in a passenger reservation system having
- a database for information relating to passengers who have purchased transport tickets and information about the scheduled departure,
- a location system as set forth in the preceding statement of invention, and
- a transceiver device provided at check-in location to provide confirmation to the database that the passenger has checked in, and
- a transceiver device provided at a departure location so that the database can be updated to indicate whether or not the passenger has departed.

In a further aspect the invention consists in a communication system including
- a network of radio signal transceiver devices provided at predetermined physical locations in a passenger terminal facility,
- at least one passenger transceiver device which is capable of establishing a communication link with one or more of the transceiver devices, and
- the system including location means to locate the position of the passenger transceiver while it is in communication range of one or more of the transceiver devices.

Preferably the network includes an interface to one or more further communication networks such that the passenger can receive information regarding one or more of departure times, flights, vessels or other transport means, internet connection, telephone connection, entertainment services.

Preferably the passenger can receive alerts or warnings regarding intended departure time.

In a further aspect the invention provides the tracking system whereby location information determined from the location system and method set forth in preceding statements of invention is displayed or recorded in real time to enable the path followed by the passenger through the terminal to be tracked.

In a further aspect the invention provides a method of tracking a passenger in a passenger terminal using the passenger location method set forth in the preceding statements of invention.

In a further aspect the invention provides a location system for locating an object (including an individual) in a defined space, the system including
- a plurality of radio signal transceiver devices provided at predetermined physical locations in the space,
- at least one object transponder device associated in use with the object, the transponder being adapted to transmit a radio signal in response to receiving a signal from one or more of the transceiver devices,
- the transponder signal being capable of being received by more than one transceiver, and
- object location means adapted to determine the position of the transponder by determining the location of the one or more transceiver devices that have received the transponder signal.

Alternatively, the transponder generates a signal which is received by the transceiver means to enable the location to be determined, In a further aspect the invention provides a security system including the location system of the preceding statement of invention, and further including a database having information regarding unauthorised locations within the terminal facility, and means to provide an alert should an individual proceed into an unauthorised area.

Alternatively, the system includes information regarding the time an individual spends in a particular location, and if the actual time spent in that location exceeds a predetermined time, then an alert is generated.

In a further aspect the invention includes a method of improving flow of individuals through a defined space, the method including the steps of
- locating individuals at periodic intervals,
- recording the location,
- analysing the paths of travel of each individual over time from the location data retrieved, and
- making physical adjustments to the defined space to reduce delays.

Preferably the method includes the step of comparing data after physical adjustments have been made to data retrieved before the physical adjustments were made to ascertain the extent of the improvement.

The term "radio signal" in this document is intended to include electromagnetic (for example optical) communication signals.

DESCRIPTION OF PREFERRED EMBODIMENTS

The most preferred embodiment described in this document refers to implementation of the invention in an airport environment. The invention and disclosure is not intended to be limited to this one application. The invention may be implemented in a number of other industries and environments. By way of example, some of these environments may include transportation terminals or stations (such as train stations, sea passage terminals, ferry terminals), hotels, casinos, shopping malls, entertainment complexes, factories, amusement parks, retail stores, service stations, banks, supermarkets and restaurants. Another field of application outside enclosed buildings or areas is vehicle tracking. This can be useful in relation to trucking companies, document tracking and courier or delivery services.

By way of a general overview, the system utilises a matrix of access points located at fixed locations throughout a nominated or defined space connected directly to a local area network. The access points communicate with electronic tracking devices, referred to in the preferred embodiment as electronic tracking clips (ETC's). The preferred communication protocol between the tracking clips and access points is Bluetooth™.

Bluetooth™ technology has been designed to allow wireless connection between various communication devices, such as mobile phones and desk top notebook computers. Transfer of data occurs in real time. The technology supports point to point and point to multi-point connections. Bluetooth™ technology has been designed to facilitate fast secure transmissions of data (including voice data), even when the communicating devices are not within line of sight. The frequency of operation of the radio transmissions is in globally available frequency bands, ensuring compatibility worldwide.

Bluetooth™ technology also provides a universal bridge to existing data networks, peripheral interfaces, and a mechanism to form small private adhock groups with connected devices away from fixed network infrastructures. It is also designed to operate in a noisy radio frequency environment. Further information about the Bluetooth™ technology is readily available to those skilled in the art to which the invention relates, for example at www.bluetooth.com.

The network may typically be deployed over areas of around 250 000 square feet and above. The access points are mounted at regular intervals throughout the physical installation to provide a comprehensive Bluetooth™ enabled network coverage zone. As each access point is located at a fixed location, it is possible to provide tracking information for each ETC as it comes into the communication range of the access point.

Each ETC may communicate extensively with an access point if desired. For example, provided the ETC has sufficient functionality, and the network has an appropriate gateway, the ETC may be used to effectively provide an internet, email or telephone connection for a user. The ETC could be provided in the form of a personal digital assistant (PDA). Also, the network could have an entertainment server having various content such as news, pictures, videos or music content that the user may access using their ETC device.

In the most preferred form, the system uses the access points operating in an active mode performing a "Scan Inquiry" to generate a list of ETC Bluetooth™ ID's in the coverage range of that access point. This enables the system to operate quickly without having to form a communications connection to each ETC. Since the range and coverage of the access points will overlap, a method using an approximation algorithm stored in the database to calculate the probable location of the ETC is used. For example, if five access points detect ETC number 1234567, then it can be assumed that the ETC is located in the centre of the access points, due to the range of each access point. This allows very fast calculations of up to thousands of ETC's without having to utilise data from a communications connection in order to ascertain the nearest access point. In the preferred form, if a more accurate indication of the location of the ETC is required, then a communication connection with the relevant ETC is performed by the access points that are within range, and the "return signal strength indicator" (RSSI) is used to work out, by process of triangulation, the nearest access point. This typically enables the position of the ETC to be ascertained to within approximately 3 meters.

The access points are referred to in this document as "remote masters" (RM's). Therefore, once a specific position for an ETC has been ascertained, the information that may be provided is, for example:

ETC number 1234567 was last connected to remote master number HF3945

Location ID: Café Zone 1.

This information provides the location ID for tracking purposes, and is preferably displayed graphically so that a staff member in a passenger terminal, for example, can locate the individual passenger who is carrying the ETC. As will be explained further below, there are a number of advantages in being able to precisely locate a real time position of any particular passenger and in being able to track in real time an approximate location for each passenger. The main advantages are that if a flight is about to depart, and a passenger is not on the aircraft, a staff member in the terminal can request the precise location of the passenger and then physically locate the passenger and escort them to the aircraft. In relation to the less precise tracking of passengers, advantages relate to a history of passenger movement being able to be retained and kept for analysis purposes. The analysis may for example be to improve passenger flows through the terminal, or be used for security purposes. Therefore, for example, if the approximate area in which a passenger (or staff member) is present is one which they should not normally be in, then the system can generate an alert and request a precise location. From knowing the precise location, the position of the unauthorised individual can be determined so that they may be escorted from the area by security personnel.

Individual remote masters have the potential to have over 255 Bluetooth™ enabled ETC's within their coverage area of approximately a 30 meter radius. Therefore, the system may use the 48 bit ED ADDR address register and be able to transmit the information back to a middleware application (as will be described further below) and the application database.

Figure 1:
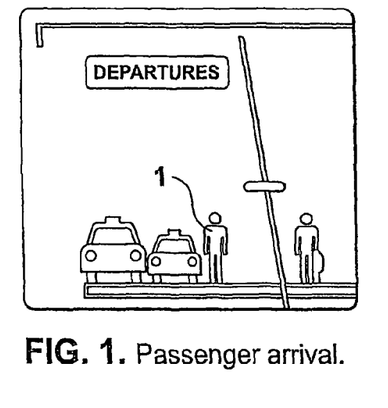
FIGS. 1-11 are diagrammatic representations of use of the invention in a passenger terminal environment
Figure 2:
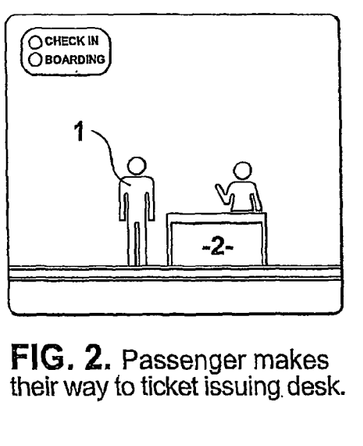
Figure 3:
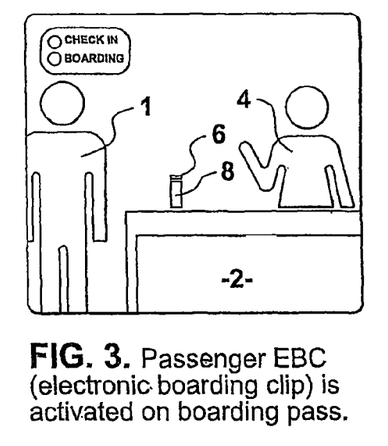
Figure 4:
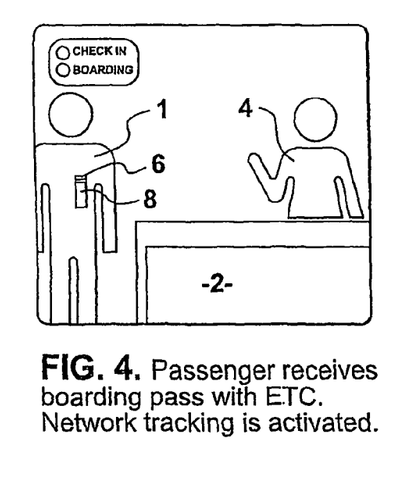

An example of use of the system in a passenger terminal will now be described with reference to FIGS. 1 to 11. Referring to FIG. 1, a passenger 1 arrives at the departure lounge of the terminal. In FIG. 2, the passenger approaches a check-in desk 2. In FIG. 3, the passenger is at the check-in desk and is in the process of receiving an ETC (electronic tracking clip). The check-in operator 4 activates the ETC 6 when issuing a boarding pass to the passenger 1. The passenger will typically already have obtained an airline ticket, so passenger data will already be present in the airline reservation system network. When the boarding pass 8 is printed, data from the airline reservation system network is provided to the network of the invention and a flat file containing the relevant data for passenger identification and flight identification is provided to the ETC 6. At the same time, a record of this data is kept on the system database and the Bluetooth™ ID number for the ETC 6 is associated with that data record. As shown in FIG. 3, the ETC is attached to the paper boarding pass 8. The passenger then takes the boarding pass and ETC as shown in FIG. 4 before departing from the check-in desk. Since the ETC 6 is now active, the remote master will identify the ETC as being within its detection range.

Figure 5:
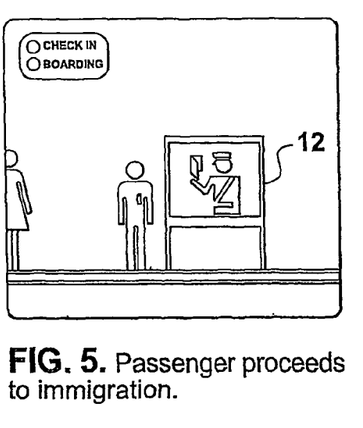
Figure 6:
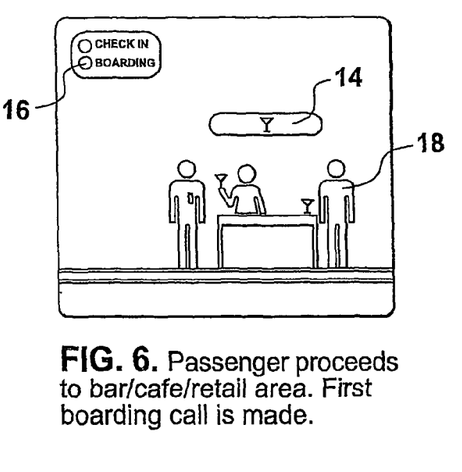
Figure 7:
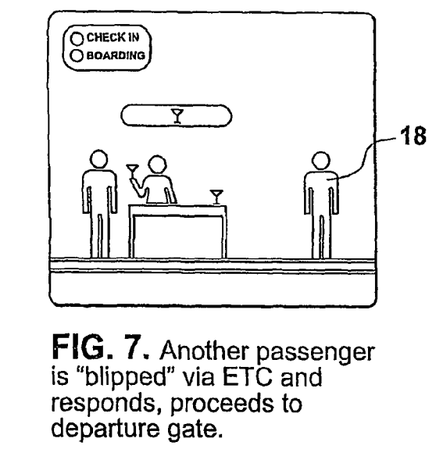
Figure 8:
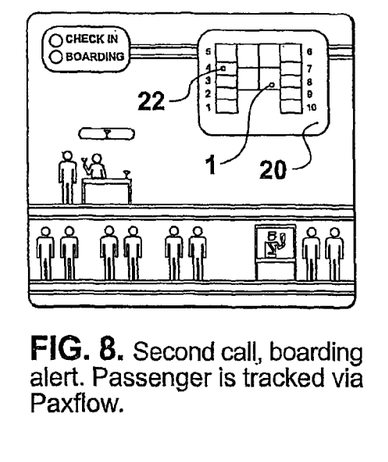
Figure 9:
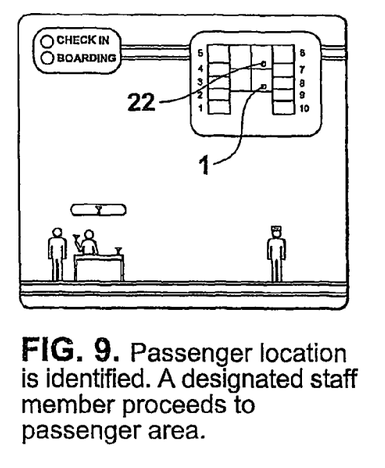
Figure 10:
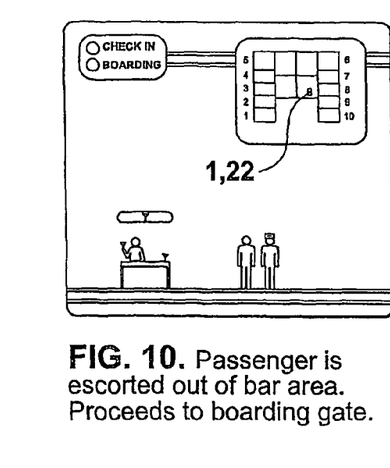
Figure 11:
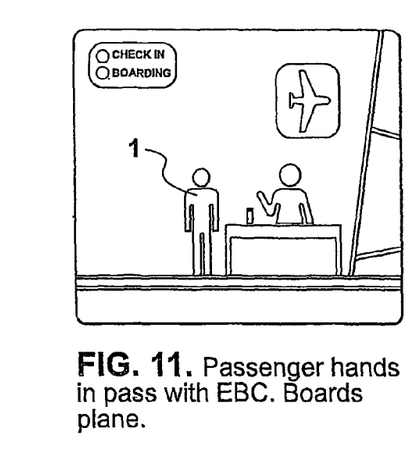

In FIG. 5, the passenger has proceeded to immigration 12, and again the passenger is within the detection range of the nearest remote master device. In FIG. 6, by way of example, the passenger has now proceeded to a bar, or other entertainment area 14 and the first boarding call is made. This is represented in FIG. 6 by light 16. Another passenger 18 responds to the boarding call and leaves the entertainment area as shown in FIG. 7. Turning now to FIG. 8, a second boarding call is made. By this time, the ETC will have also alerted the passenger that he/she is expected to proceed to the boarding lounge to board the aircraft. However, the passenger has not responded. As shown in FIG. 8, a staff member is now provided with a display 20 which shows a plan view of both the passenger and the staff member 22 in terms of their location relative to a terminal floor plan. It can also be seen from FIG. 8 that the system can be deployed on a number of different levels so that different floor plans may be shown to enable easy location of stray passengers. The display 20 is typically portrayed to a terminal staff member on a PDA device. The user can use the plan to orientate him or herself so as to most easily locate the relevant passenger. The relatively precise location of the passenger is known by using a system location request as described above. In FIG. 9, the staff member 22 is approaching the location of the passenger 1 and this is reflected in the updated display 20. In FIG. 10, the staff member has located the passenger and is in the process of escorting the passenger toward the aircraft. Finally, in FIG. 11, the passenger is shown at the departure gate boarding the aircraft.

The system will now be described in greater detail with reference to the following components:
Electronic Tracking Clips (ETC)
Remote Masters (RM)
ETC Dispensing Device
ETC Collection Device
Middleware application handling and Process Flows
Other Applications Electronic Tracking Clip (ETC)

In the preferred embodiment, the ETC is equipped with an embedded Bluetooth™ chipset solution and rechargeable power supply. The power supply is preferably provided in the form of a battery and may be inductively charged without physical electrical contact being required. ETC's are attached to passenger boarding passes at check-in, and are removed when either the boarding pass is scanned at passport control or customs (and then reattached), or at the boarding gate, where the ETC's are collected and recycled. ETC's are tracked via the unique ID (48 bit) of the device. This ID is scanned via the remote masters (RM's) using a scan inquiry, and transmitted back with the RM ID via the network to the application server. This allows the application server to display the location ID (linked to the RM ID) and hence display the location of an individual ETC, or one or more groups of ETC's. The use of a scan inquiry is a different approach to convetional operation of Bluetooth access points. Usually, access points operate in a passive mode waiting for Bluetooth connections to be initiated by another Bluetooth device (e.g. a PDA). Instead, the present invention uses the "Scan Inquiry" function to detect ETC's as they enter the range of each access point.

The middleware application (which will be described further below) registers each ETC as it enters and leaves the cover of each remote master via a packet containing the ETC ID being transmitted back to the middleware application. The system will send messages and alerts to ETC's through the middleware application. The middleware application will then identify the last remote master that detected the ETC, and try and form a connection to the ETC to transmit the message.

Each ETC has a built in clock, and has stored voice prompts. As the ETC is programmed at check-in the current time, the flight time, boarding and call times are all loaded onto the ETC memory. At the specified time, each event will be performed. Therefore, when the first flight time expires, the first boarding call will be made to the passenger by the ETC, and the second boarding call will be made at the next predetermined time, then finally the last call will be made. Therefore, network resources do not need to be consumed in having a remote master establish a communication link with each ETC in order to announce boarding call times. However, this option is available if desired.

The battery life of each ETC is sufficient for at least 48 hours of continuous use before recharging is required.

Not only does the ETC provide an audio alert but it also preferably provides a visual alert by activating one or more LED's. Preferably, a green LED and a red LED is provided on each ETC, together with a speaker device given to announce the boarding calls. An example of the various alert states is provided below:

Alert state 1
Green LED flashing plus audio alert 1
Alert state 2
Red LED flashing plus audio alert 2
Alert state 3
Red and green LED on plus audio alert 3
Alert state 4
Audio alert 4.

As mentioned above, these alerts may be pre-programmed, taking advantage of the internal clock, or can be selectively activated by the system. This allows the alerts to be generated even when the ETC is out of system range. The clock stores the last time the network was detected, and if this is greater than a predetermined time, the passenger is alerted.

The ETC may be provided in a variety of different physical forms, but the most preferred form has a small form factor. The device is also preferably lightweight and durable.

Turing to FIGS. 12 to 17, the most preferred form of ETC will be described.

Figure 12:
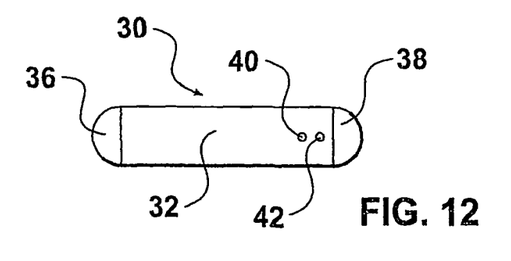
FIG. 12 is a plan view of an electronic tracking clip (ETC) according to the invention
Figure 13:
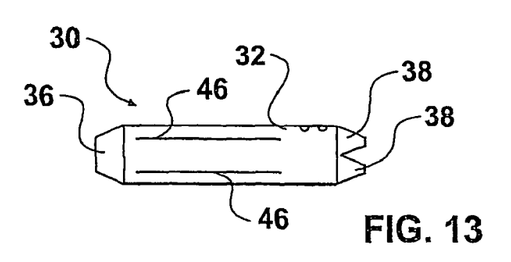
FIG. 13 is a side elevation of the clip of FIG. 12

From FIGS. 12 and 13 it can be seen that the ETC, which is generally referenced 30, has two arms 32 and 34. The arms are connected to each other at one end by a hinge element 36. At the other end of each arm are members 38, which may be selectively magnetically coupled to each other. The hinge 36 may be constructed from a single piece of material, such as a suitable 45 resilient plastics material which is bonded to each of the arms. A unitary piece of material has the advantage that it is easily made as a moulded one piece item, and only needs to be sufficiently flexible to allow the arms to open over relatively small angle to accommodate or remove the slim paper or plastics boarding pass.

The coupled members 38 may be coupled when the clip is attached to a boarding pass by passing a current through the members 38. This effectively locks members 38 together, and the bond is sufficiently strong that the clip can only be removed from the boarding pass by destroying the pass. In this way, any tampering with a clip should be noticeable.

The construction has the advantage that the arms each frictionally engage with the boarding pass by virtue of the tight and secure engagement of the arms on either side of the pass. Therefore, the boarding pass itself is not destroyed or altered in any way by use of the clip, yet the clip remains tightly attached to the pass. In this way, when the clip is removed (by the attachment members 38 having a suitable current passed through them to disengage the magnetic coupling), the boarding pass may be used in the usual way as the passenger boards the aircraft.

Figure 14:
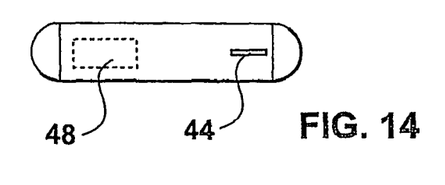
FIG. 14 is a plan view from below of the clip of FIG. 12

As can be seen in FIG. 12, a green LED 40 and a red LED 42 are provided in upper arm 32. The LED's face outwardly so that they are visible to the pass holder (i.e. the passenger). In FIG. 14, the external surface of the lower arm 34 can be seen and this shows the opening for the speaker 44.

The batteries 46 are shown in dashed outline. Although one battery is shown in each arm, it will be appreciated that a single battery may be provided. In FIG. 14, the Bluetooth™ CPU and antenna 48 is shown in dashed outline.

Figure 15:
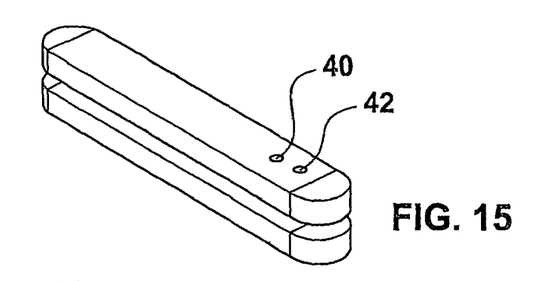
FIGS. 15 & 16 are perspective views of the clip of FIG. 12
Figure 16:
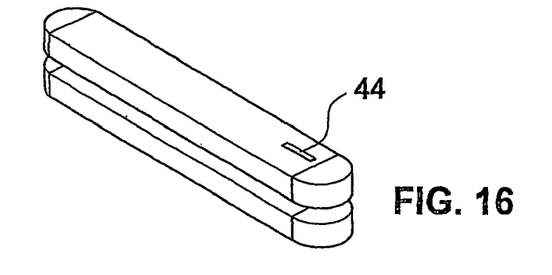

FIGS. 15 and 16 provide perspective views of two units provided at different angles, so that a clearer depiction of the features referred to above in FIGS. 12 to 14 is provided.

Figure 17:
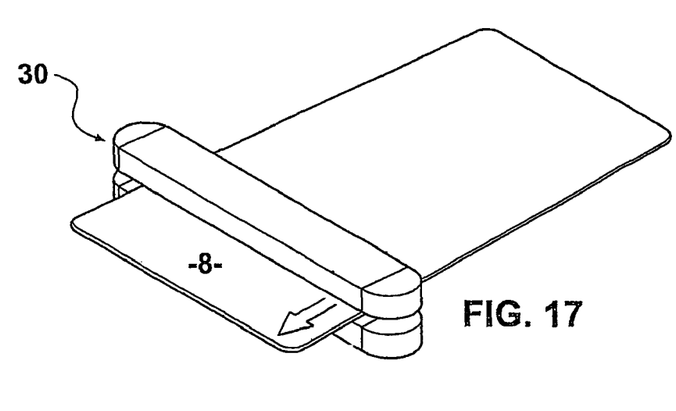
FIG. 17 is a perspective view of the clip of FIG. 12 in use on a passenger boarding pass

In FIG. 17, an ETC device is shown attached to a boarding pass 8.

Each ETC, in the preferred form, includes the following features:
+OdBm 10 meter range
CPU—Hyperstone, ARM processor
2.4 GHz onboard antenna
Chipset CSR BC01
1 megabyte flash chip
Optional 8 megabyte SD RAM chip (for voice data)
Fast UART chip
OSC 120
Rechargeable battery
Speaker
Synchronised ETC clock to issue boarding prompts automatically
3.3 volt DC power.

As discussed above, the ETC device can be provided in a number of different forms. One particular form may be a PDA (personal digital assistant). If this option is followed, then the PDA is used to emulate a boarding pass, and can carry all the data normally included with boarding pass, but further including the advantages of an LCD screen of a reasonable size for showing video information, and a better quality speaker. If this option is followed, then the paper boarding pass is not,used, and instead the PDA device is issued at check-in to each passenger, and the passenger returns the PDA device when boarding the aircraft. In practice, this option is expensive to implement, at least in the short term. However, PDA devices may be used by certain authorised individuals, such as terminal staff members, since they provide additional functionality to allow the staff member to communicate with the network to perform functions such as locating late boarding passengers (as described above with reference to FIGS. 1 to 11).

Figure 18:
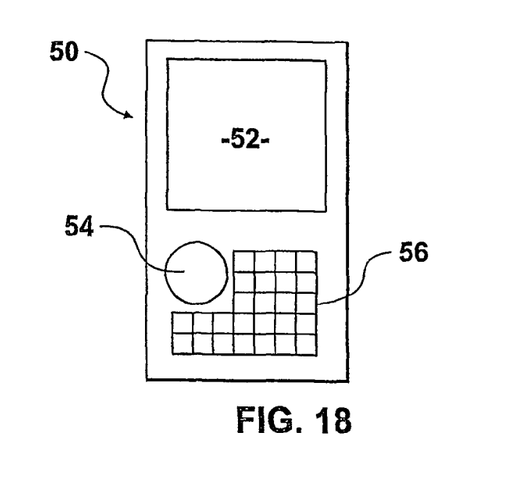
FIG. 18 is a diagrammatic illustration of a communication device that can act as an electronic boarding pass or tracking, location and communication device which may replace the ETC of FIGS. 12 to 17

Rather than using a commercially available device such as those presently marketed under the term "personal digital assistant", a proprietary device which includes greater functionality than the ETC may be provided. An example of such a device is shown diagrammatically in FIG. 18 and is generally referenced 50. The device includes a screen 52 which is of a reasonable size, for example 3 or 4 centimeters square, and includes a speaker 54 and keypad 56. Therefore, when a communication link is established between the device 50 and the network, graphic images can be viewed, sound can be heard from speaker 4 and the keypad 56 may be used to navigate the screen or to generate messages, for example email messages or SMS messages. Again, the device is preferably powered from a battery which may be recharged without physical electrical contact being required.

Figure 19:
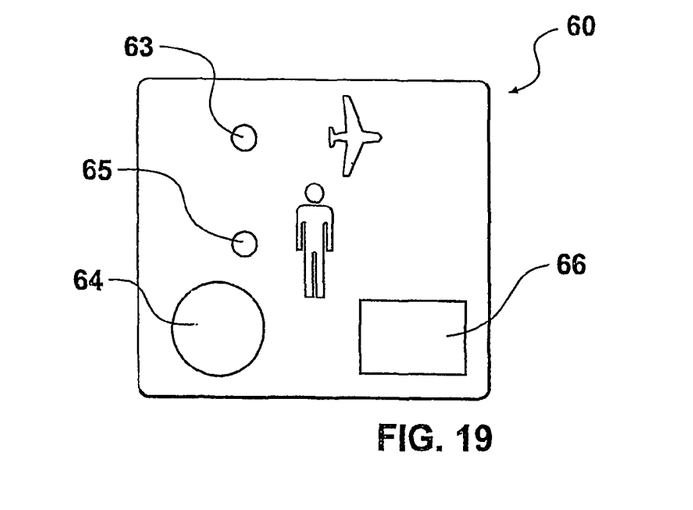
FIG. 19 is a further alternative ETC device

The ETC does not need to take the form shown in FIGS. 12 to 17, but could instead be similar to that shown in FIG. 19 with a suitable physical clip to allow the device to be attached to the paper or plastic boarding pass. Thus referring to FIG. 19, an alternative device is shown generally referenced 60, having a boarding LED (preferably green) 63, and a red LED 65 to indicate that the user should find a staff member, usually so that they can immediately board the required flight. A speaker 64 is provided together with a button 66 which may be used to provide some basic feedback to the system, such as an acknowledgement of a boarding call.

Figure 20:
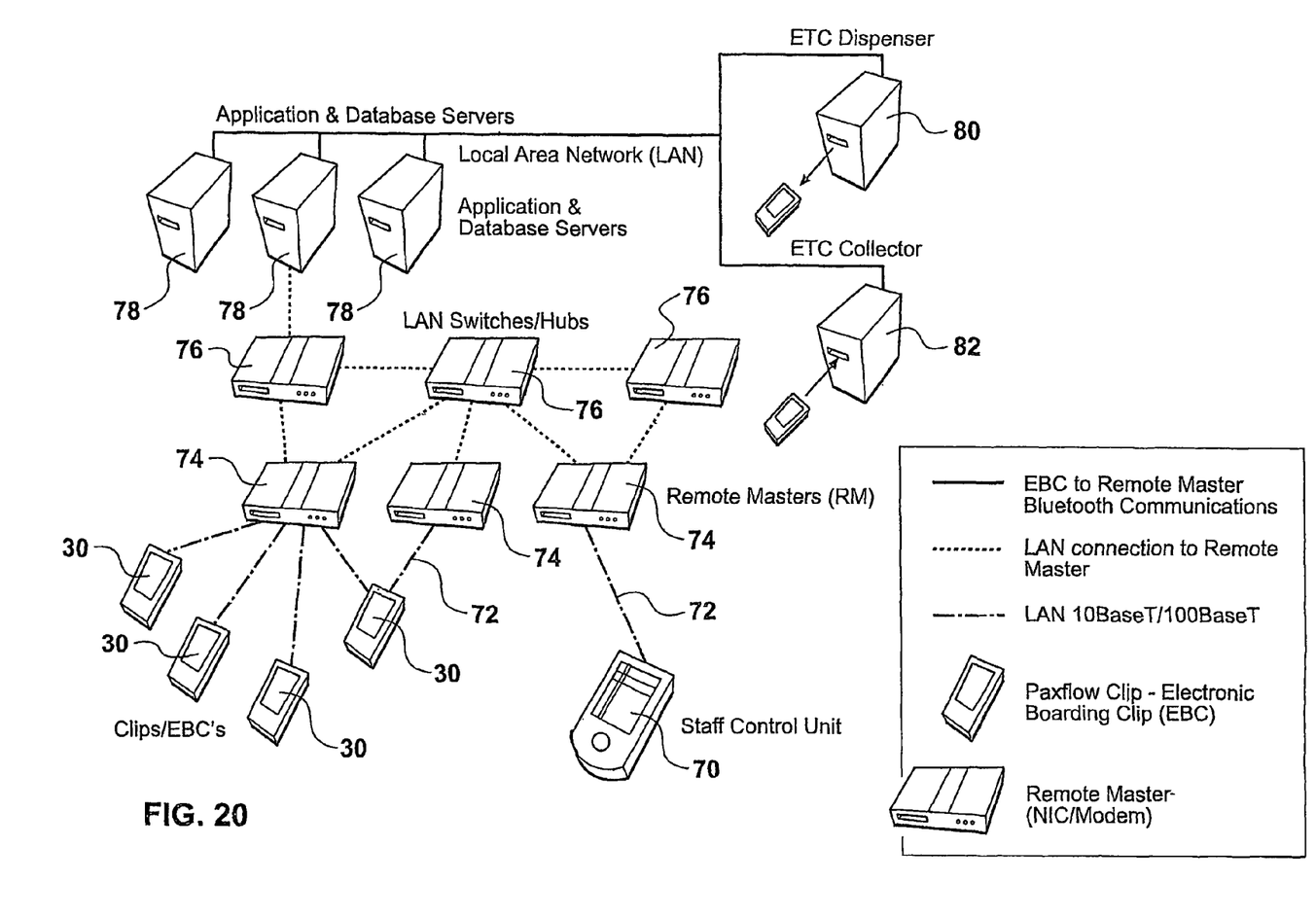
FIG. 20 is a schematic of a location, tracking and communication system according to the invention

Turning now to FIG. 20, an overall schematic of the location, communication and tracking system of the invention is shown. The ETC's are shown generally referenced 30, and a staff control unit in the form of a PDA, as discussed above, is shown referenced 70. Wireless Bluetooth™ communication paths 72 allow the ETC's and unit 70 to selectively communicate with one or more of the matrix of remote masters 74. The remote masters 74 are, in turn, connected to local area network (LAN) switches/hubs 76. These are in turn connected to application and database servers 78. Finally, an ETC dispenser 80, and collector 82 are also connected into the network. The network connection between the remote masters 74 and the switches/hubs 76 is preferably a physical wired connection, as is the connection between the switches/hubs 76 and the application and database servers and the dispensers and collectors. However, these connections may also be wireless connections. The LAN connection between the application and database servers, and between the application and database servers and the collectors and dispensers is preferably 10 BaseT/100 BaseT.

Each remote master is equipped with an embedded Bluetooth™ chipset solution combined with RAM for running the routing and messaging application. The RM scans a coverage radius of approximately 30 meters and reports any change in the state of ETC's. Any change of state will typically be the result of the ETC leaving or entering the coverage area. RM's are preferably positioned at approximately 15 meter intervals. Unlike ordinary Bluetooth™ communication, the RM's preferably actively perform a scan enquiry at periodic intervals, and receive responses from ETC's that are within range. Each RM is capable of receiving responses from more than 255 ETC's.

Therefore, there is a matrix of RM's that provides a seamless area of coverage within a defined space. Conventional Bluetooth™ access points can handle seven active connections and 254 Bluetooth™ devices. To deal with more than 254 Bluetooth devices for tracking, this invention uses the BR_ADDR 48 bit address allowing a virtually limitless number of devices within the same area. The polling rate of devices is optimised to maximise performance. In the preferred embodiment, a six to ten second cycle is used. If there is significant communication with a number of ETC devices within the coverage area, this cycle may need to be longer.

Each RM is provided as a mountable device with mains power connection. Therefor, the RM's can be mounted at any convenient location within a building such as an airline terminal.

The technical requirements for each RM are as follows:
+20 dBm power, 30 meter range
Mains power via transformer
Communicates to and from ETC's (and scatter net hubs)
WLAN system
Able to address over 255 BluetoothI™ nodes
Packet routing functionality
LAN connection for hybrid LAN/wireless system
CPU Hyperstone, ARM processor or equivalent
2.4 GHz onboard antenna
Chipset CSR BC01
2×1 megabyte flash chip
8 megabyte SD RAM chip
Fast UART Chip
OSC 120.

From FIG. 20 it is apparent that the network connections are made in such a way that should a remote master fail, the network has a "self-healing" capability in that communication can still occur-using adjacent remote master devices. Therefore the required communication, location and tracking facilities are still provided. Furthermore, the communication range can be extended i.e. by use of the Bluetooth™ technology and ETC that is outside the main terminal which is being covered can communicate with the remote master via another ETC device if necessary. In this way, communication can be provided to a queue of passengers that extends into a region which is not intended to be ordinarily covered by the system.

Although not shown in FIG. 20, specific sensors may be provided on the network which act as "kiosks". These have a sensor which allows an ETC to establish communication with the network when the ETC is within a close range of the kiosk, for example one meter. In this way, a passenger with an ETC can approach the kiosk, and the kiosk will be able to identify information about the passenger, and display necessary information to the passenger on a screen for example and perhaps also provide audio information for the passenger, for example about their flight details, boarding times, retail facilities in the terminal etc. If the passenger has a PDA device or other Bluetooth™ enabled apparatus, the kiosk may also be able to provide a gateway for that user to communicate with the network, or possibly with other information sources such as the internet, or telephone systems.

ETC Dispenser Device

The dispenser device 80 (FIG. 20) is required to dispense ETC's. The dispenser physically carries a large number of ETC's and includes an inductive charging mechanism to charge the ETC's inductively while they are in storage in the device. The storage device preferably comprises a magazine (not shown) which is physically collected from the collector 82 and transported to the dispenser so as to provide a supply of ETC's. The dispenser itself is preferably permanantely mounted at a check-in desk.

When an ETC is required, the relevant data to be supplied to the ETC is loaded onto the ETC by the dispenser. The data is derived by the dispenser over the network connection from the system database. When the data has been downloaded, the dispenser provides the relevant ETC in a position where it can be picked up by the check-in operator and presented to the passenger. The device that provides the magnetic coupling to connect the clip to the boarding pass may be provided as part of the dispenser, or as a separate unit on the check-in desk.

The dispenser also includes a close range Bluetooth™ sensor to read the card ID for each ETC. In this way, the system is aware of the unique ID being assigned to particular passenger data.

The technical requirements include:

+0 dBm power, less than 1 meter range Bluetooth™ sensor

Sensor used to read ETC ID and relay information back to application server

Magazine to store multiple ETC, interchangeable with ETC collection device magazine Induction charging capability to recharge ETC when in magazine.

ETC Collection Device

The collection device 82 (refer FIG. 20) is used to collect ETC's at system exit points. A typical exit point is a boarding gate just prior to the passenger boarding an aircraft. The collector is a desk mounted device which has a collection feeding slot for feeding collected ETC's into a storage magazine. As described above in connection with the dispenser, the magazine is one that can be removed and physically transported back to the dispenser devices. In the preferred form, the collector 82 includes a method of cleaning and disinfecting ETC's for hygiene purposes. In the preferred form, this includes use of ultra bright UV light, and may be augmented by having the ETC's constructed from a plastics material that resists bacteria growth. However, cleaning agents or brushes may also be provided.

The collection slot for the collector 82 includes a close range Bluetooth™ sensor to read the card ID for each ETC as it passes through. This data can then be relayed to the application server to register that the ETC has been collected. The provision of this information to the application server allows the system to know that the passenger to which the ETC has been assigned has passed the relevant departure point in the system, so that no further tracking of that ETC should be performed and no further boarding calls should be made.

The technical requirements include:

+0 dBm power, less than 1 meter range Bluetooth™ sensor

Sensor used to read ETC, ID and relay information back to application server

Magazine to store large numbers of ETC, the magazine being interchangeable with the ETC dispenser device Induction charging capability to recharge ETC's when in the magazine.

Figure 20A:
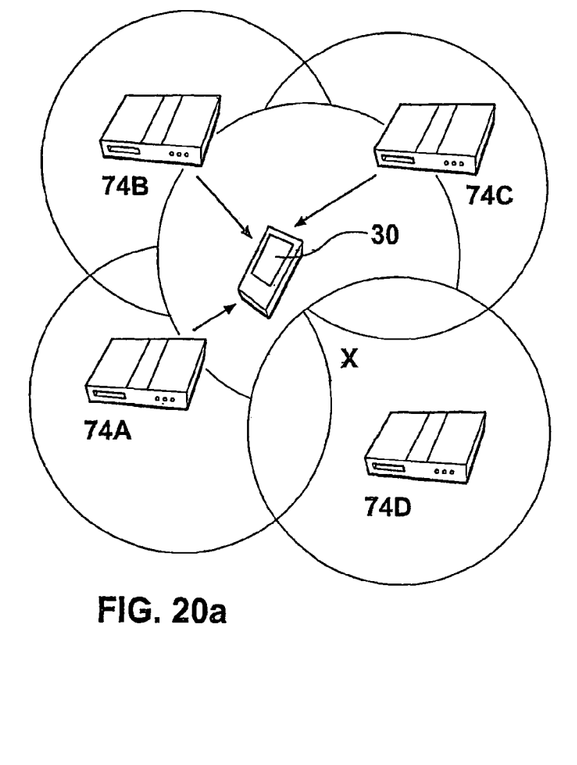
FIG. 20A is a diagrammatic plan view of an ETC in communication with a number of sensors, showing ETC location determination.

Turning to FIG. 20A, some further detail is shown of the location system described earlier in this document. The remote masters 74A-C have all detected the ETC 30, but RM 74D has not. The system application uses an algorithm to approximate the location of the ETC. This means that the RM's do not have to form a communication connection with the ETC, thus allowing a much faster polling rate. The approximate location using this method can be determined to within approximately 10-30 meters.

Precise location (to within approximately 3 meters) of the ETC can be achieved by forming a communication connection with each RM. Then, a triangulation algorithm is used based on returned signal strength data. The signal strength is determined from the Return Signal Strength Indicator (RSSI), measured in dBm from each RM. The performance of the network is then maximised for tracking by minimising the number of connections required.

Middleware Application and Example of Process Flow

Figure 21:
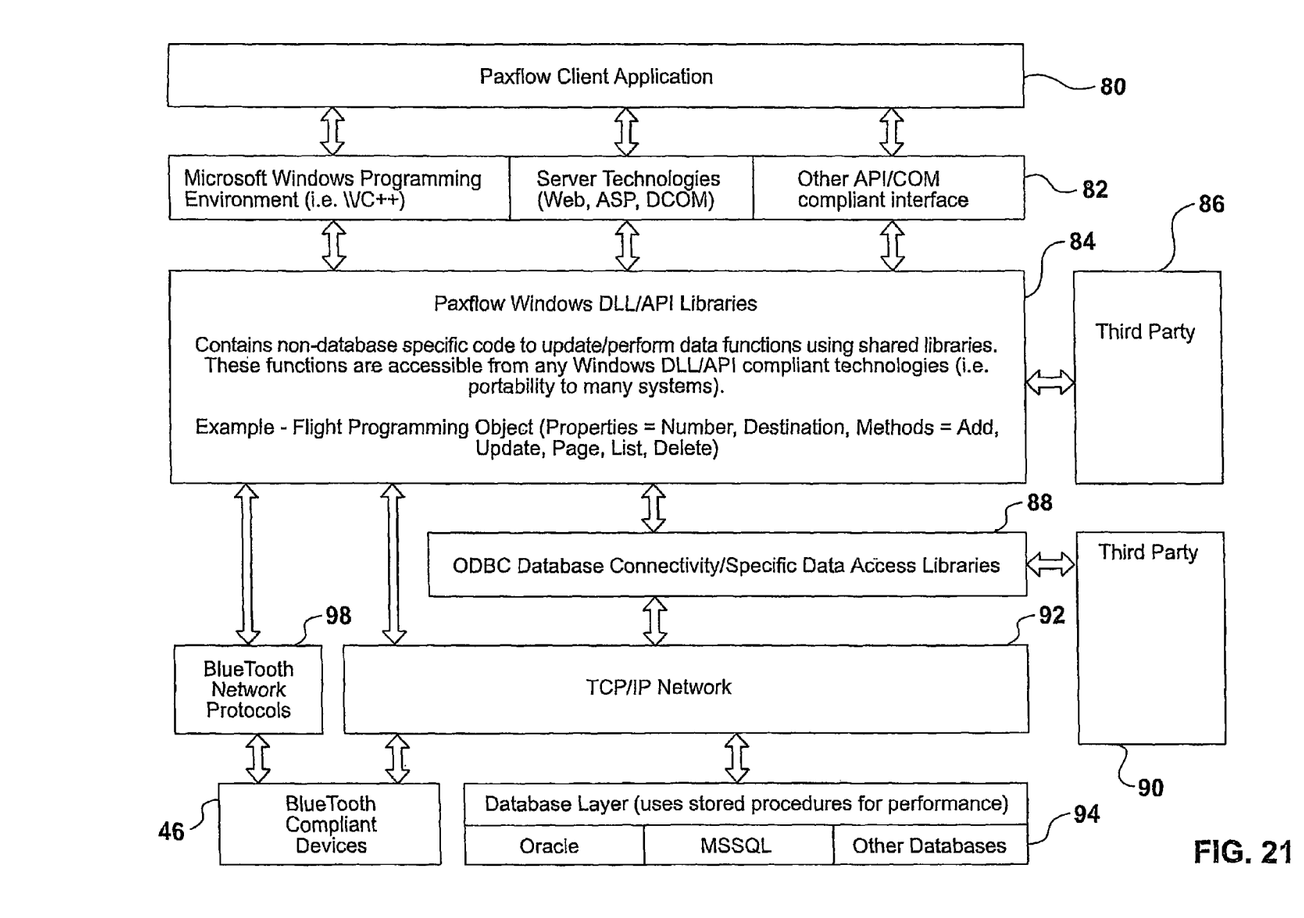
FIG. 21 is a diagrammatic illustration of the software architecture used according to the system of FIG. 20

Referring to FIG. 21, the Client application layer 80 interfaces with DLL/API library layer 84 via one or more appropriate interfaces 82.

The library "middleware" layer 84 contains non-database specific code that updates or performs data functions using shared libraries; for example there may be a Flight Programming Object that requires updating based on changing flight times or destinations. The update information can be obtained from one or more third party sources 86 such as an airline database. The functions are preferably easily accessible, so third parties 86 can provide the necessary data and/or maintain the libraries. If a RM fails to deliver a message due to an ETC moving or not responding, the message will be sent back to the middleware application until a RN registers the ETC again.

This middleware layer handles all traffic to and from the RM's/ETC's and the application 80 and application database 94. By utilising messaging/tracking protocols it allows the application 80 to generate and receive messages and notifications from RM's and ETC's. Tracking information is transmitted to the database 94.

An Open Database Connectivity (ODBC) layer 88 and TCP/IP layer 92 are provided between the library layer and the database layer 94. Third parties 90 may connect to the ODBC layer 88.

Bluetooth compliant devices 96 can communicate with the library layer 84 via the TCP/IP layer 92 or via Bluetooth Network Protocol layer 98.

Figure 22:
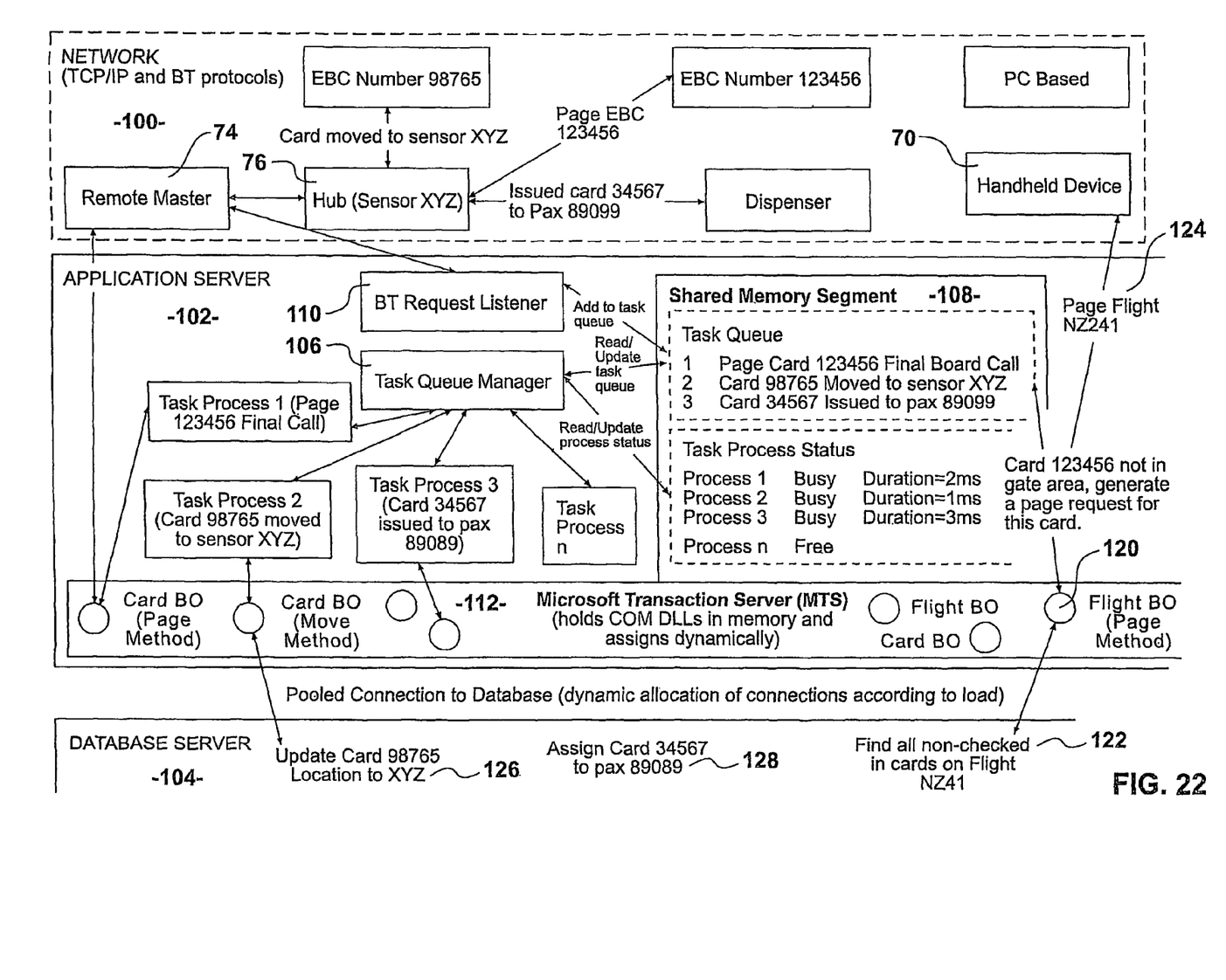
FIG. 22 is a diagram showing examples of interaction between the network, application server, and database server of the system of FIG. 20.

Turning to figure 22, a schematic of system operation is illustrated. The network 100, application server 102 and database server 104 are shown diagrammatically. Within the network, a remote master 74 is shown together with a hub 74, a handheld device 70, two ETC's 30 and a dispenser 80.

The application server includes a task queue manager 106, shared memory segment 108, Bluetooth request listener 110, task processes 1-*n*, and transaction server 112.

The examplary process set forth in FIG. 22 begins with Flight NZ241 being paged 120 which results in a database request 122 to find all non-checked in cards on that flight, and a page instruction 124 to device 70. The database reveals that card 123456 has not been checked in and is not in the gate area. This results in a final call page request (process 1) for that card. Process 1 is placed in the task queue and the status is recorded under the task process status. Remote master 74 delivers the page request to ETC 123456 and if receives the response from the BT request listener 110.

Process 2 relates to movement of ETC 98765 to another sensor. The updated location is stored in database 104 at step 126. Process 3 relates to issuance of ETC 34567 to passenger 89089. The dispenser issues the card, which is sensed by the network and passed to the BT request listener, and the database stores the assignment of card 34567 to passenger 89089 at step 128.

Figure 23:
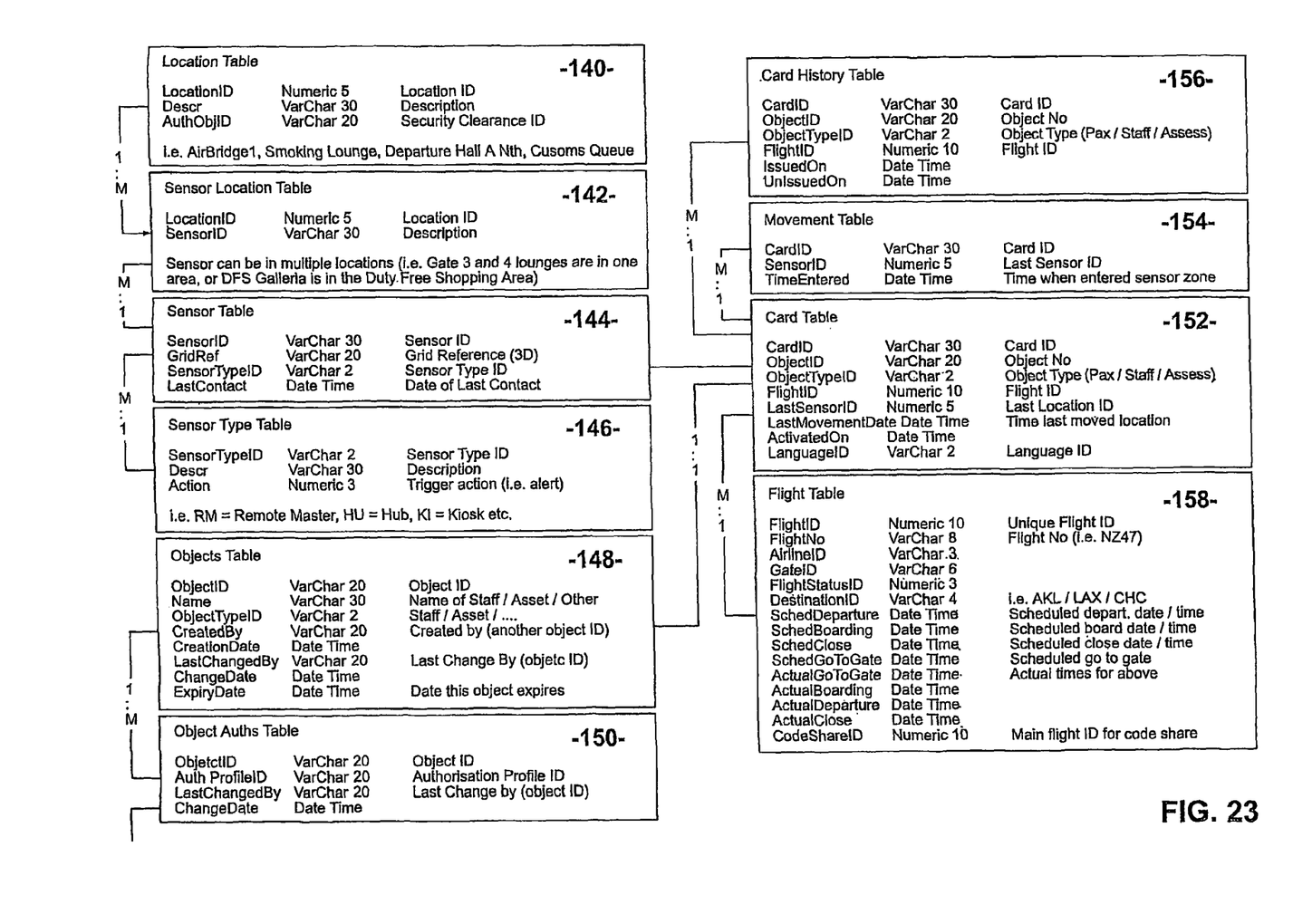
FIG. 23 is a diagram of exemplary data tables relating to the system of FIGS. 20 to 22.

In FIG. 23, the relationship between various tables of database 104 (FIG. 22) is illustrated. Thus there is an ETC location table 140 which is related to a sensor location table 142. The location table assigns location ID's to various parts of the facility required to be covered by the system. The sensor location table relates each Bluetooth sensor (from sensor table 144) with the location ID for that sensor.

The sensor table 144 is also related to a sensor type table 146 which identifies the type of each sensor.

An objects table 148 and related object authorisation table 150 are also provided. The objects table is also related to a card (i.e. ETC) table 152 which is in turn related to a card movement table (i.e. recording card movement in relation to sensors over time) 154, a card history table 156, and a Flight table 158.

Other Applications

The system may also be interfaced to or be implemented as a security system. This can be connected to various existing proximity and motion detection means. The wireless technology can also be coupled with a global positioning system. This provides a large area coverage integrating GPS with long range BT sensors which allow an alternative method of broadcasting GPS information within the range of BT sensors instead of using an expensive cellular system.

In another application the BT/Bluetooth technology of the invention can be used with respect to a retail system whereby loyalty club membership, assets tracking etc can be integrated. Baggage and trolley tracking is also possible whereby long range sensors are placed on various inanimate objects so that they can be tracked. This may, for example, stop the illegal removal of airport property.

In a further application, the system can be used with entertainment or gambling systems such as in casinos. Loyalty cards, virtual casino chips, credit card information etc as mentioned previously with respect to retailing is also possible. For example, a player can use a virtual tab for hotel, casino, restaurants and entertainment areas. The casino can also use the system as a way of having dynamic real time user tracking. The dynamic tracking can be linked to game payer modification that is where some machines have odds above the normal paying rate. These can provide a way of moving the high paying machines to other machines. For casinos the punter tracking system provides a way for casinos to provide loyalty based from awards, virtual tabs, event notification, lucky punter selection and punter flow mapping combined with interactive kiosks it is possible to provide virtual guides, virtual game instructors, a casino map and further information as is necessary, Another application the wireless technology can also be applied to cruise ships which provide a closed or captive system. The wireless technology can be utilized with credit card information, port information, location/map information you can also provide ship activity information such as events movies and when various meals are to be put on. Inanimate objects such as baggage, trolleys etc can also be tracked and monitored. Passengers or risk passengers such as children also can be tracked so that you minimise the time spent in trying to locate people and also who may have washed overboard. The loyalty cards as mentioned with the casinos can also be used here along with, the kiosks etc. Also the wireless technology can be used with medical applications in mind.

The cruise ship market provides a range of tracking and messaging options related to the size of the ship, the inherent structure of a ship and the various markets involved. Cruise ship markets can include a number of possible applications for wireless technology such as the separate communication systems needed for the tracking of staff, the tracking of guests, messaging and casino punter tracking. Combined with the specialist functionally for a casino the cruise ship market provides a similar market as for other areas in the entertainment industry, such as hotels and theme parks.

In another application the wireless technology can also be combined with security operations. Security operations can be within any industry such as the entertainment industry or it can be at airports as well. It can be possible to dynamically change machines to prevent cheating on one particular machine therefore the security it can provide an area of no go areas for non staff members.

Security is an increasingly important issue, especially in the airport context. The present invention allows a number of new security options.

The first is Bluetooth Door Access Control. 1 m/10 m+0 Dmb sensors may be mounted above access doorways with directional antennas. The system can thus identify the individual at the doorway, using the Bluetooth ID, and selectively allow that user to access the doorway, dependent on that users security clearance as determined from a security database. Another is to have close range Bluetooth sensors mounted by security doors. This eliminates the conventional RFID Hip Swivel to gain access to security doors.

Paxflow system automatically controls car-parking doors using a 10-meter range Bluetooth sensor mounted using a directional antenna. It also enables access to be logged. For example vehicle, asset, door/secure area access and proximity can all be logged.

In the preferred form, the system automatically grants access to people as they approach a security door within a certain range or holds security until pass code is entered and verified against staff records to ensure that both EBC and Staff codes match.

The system also allows integration with Bluetooth Elevator Door and Floor Access control. This enables access to specific levels, or for a user to go automatically to a specific floor, say level 1—if access to only 1 level is authorised. The system may also interface to a Biometric system to verify person and pass match for added security. Verifying Biometric security information with EBC/Staff security information provides an additional layer of security. Security surveillance after staff/personnel have past through a security door can also be achieved to allow tracking and monitoring movements of personnel and alerting security personnel to detect unusual behaviour. An extension of this functionality is the application of the system to lifts or doing without keypads for operation. The system may detect a Bluetooth™ enabled PDA carried by an authorised user and display a keypad on the PDA touchscreen which the user can then use to operate the door or lift. For additional security, unique biological identifiers may be interfaced to the system. For example, a palm reader may be used to verify a users identity. Data relating to the unique biological identifier may be stored in the system database against the Bluetooth™ ID and/or user information.

Finally, the system has the ability to track and page groups of Staff, for example ground crew units, cleaners, baggage handlers etc. This is a significant advantage since staff security issues, particularly at airports, are an important security concern.

This invention may also broadly be said to consist on the parts, elements and features referred to or indicated in the specification of the application individually or collectively and any or all combinations of any two or more of the parts, elements or features and where specific interges are mentioned herein which have known equivalents such equivalents are deemed to be incorporated herein as if individually set forth.

The invention claimed is:

1. A personal location system configured to determine an approximate location of all Bluetooth capable transponder devices within a facility at any given time, and a precise location of a particular Bluetooth transponder device at that time, the system comprising:

a database configured to store the approximate location of all Bluetooth capable transponder devices within a facility at any given time, and the precise location of a particular Bluetooth transponder device at that time;

a plurality of personal transponder devices, each personal transponder device associated in use with a person;

a plurality of Bluetooth signal transceiver devices at fixed locations within the facility, the transceiver devices being spaced apart from one another, each of the transceiver devices having a range greater than the spacing between the transceiver devices and less than an area of the facility, each of the transceiver devices having a processor and memory to store and transmit information, each of the transceiver devices being connected with at least one server configured to process information from each transceiver, and storing information in the database of the location of the transceiver reporting the detection of a particular one of said plurality of transponder devices within range of that transceiver and date/time stamp of the transmission of data relating to that detected transponder device;

each personal transponder device being configured to receive and respond to a scan inquiry from one or more of the transceiver devices, each transponder device having a unique 48 bit address stored in the transponder device, each transceiver device being configured to send the scan inquiry to all transponders within range at periodic intervals, and storing information on the unique 48 bit address of each transponder device detected within range, and checking for a change of state of the information previously stored in a respective memory, when a transceiver detects a change of state information that a transponder enters or leaves the coverage range of that transceiver, the transceiver transmits that change of state information with a date/time stamp to the server for an analysis and storage in the database, the server being configured to calculate and store in the database the approximate location of all of said transponders at any given time based on the number and location of transceivers detecting the presence of said transponders within their range by the unique 48 bit address of each particular transponder within range of those transceivers, and when the precise location of one or more transponders is required then looking up the location of the nearest transceivers to a particular transponder and forming a communication connection with that transceiver and using a triangulation algorithm based on returned signal strength data to determine the precise location of said one or more transponders.

2. The personal location system as claimed in claim 1, wherein the transponder device includes a memory and the memory in use records information relating to the person, and events producing a person alerting action in a transponder are triggered from information in the memory.

3. The personal location system as claimed in claim 2, wherein the alerting action is a visual alert.

4. The personal location system as claimed in claim 2, wherein the alerting action is an audible alert.

5. The personal location system as claimed in claim 2, wherein the information relating to a person included in the transponder memory includes information relating to the boarding time and scheduled departure time of an airline service and the transponder may act on this information.

6. The personal location system as claimed in claim 2, wherein the transponder comprises a passenger boarding pass.

7. The personal location system as claimed in claim 1, wherein each transponder device has a clip configured to clip on to an airline boarding pass.

8. The personal location system as claimed in claim 1, wherein each transponder device includes active response means to allow the person to actively communicate with the system.

9. The personal location system as claimed in claim 1, wherein persons leaving the facility are logged out and in the case of passengers their transceiver is retrieved and stored for reuse by another passenger.

10. The personal location system as claimed in claim 1, wherein the transceiver devices are set to send a scan inquiry every 6 to 10 seconds.

11. The personal location system as claimed in claim 10, wherein the spacing between the transceiver devices is approximately 15 meters.

12. The personal location system as claimed in claim 11, wherein the range of each of the transceiver devices is about 30 meters radius.

13. The person location system as claimed in claim 1, wherein the facility is an airport terminal and passengers are issued with the personal transponder devices and when one or more missing passengers do not enter an airport departure gate within a required time their approximate location is requested from the database.

14. The person location system as claimed in claim 13, wherein the precise location of the missing passengers is obtained so that the missing passengers can be located and escorted to the departure gate.

15. The person location system as claimed in claim 1, wherein the facility is an airport terminal and passengers are issued with the personal transponder devices, and the database of approximate locations of all passengers is analyzed to determine passenger flows through the airport.

* * * * *